US012579791B2

(12) United States Patent
Li et al.

(10) Patent No.:  US 12,579,791 B2
(45) Date of Patent:  Mar. 17, 2026

(54) AUTOMATED METHODS FOR GENERATING LABELED BENCHMARK DATA SET OF GEOLOGICAL THIN-SECTION IMAGES FOR MACHINE LEARNING AND GEOSPATIAL ANALYSIS

(71) Applicant: ARAMCO SERVICES COMPANY, Houston, TX (US)

(72) Inventors: Weichang Li, Houston, TX (US); Osama B. Dabbousi, Houston, TX (US); Saif S. Alhajri, Houston, TX (US); Mustafa Ali H. Al Ibrahim, Safwa (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 287 days.

(21) Appl. No.: 18/458,005

(22) Filed: Aug. 29, 2023

(65) Prior Publication Data

US 2025/0078472 A1     Mar. 6, 2025

(51) Int. Cl.
*G06K 9/00*          (2022.01)
*G06F 16/951*        (2019.01)
(Continued)

(52) U.S. Cl.
CPC .......... *G06V 10/774* (2022.01); *G06F 16/951* (2019.01); *G06T 7/40* (2013.01);
(Continued)

(58) Field of Classification Search
CPC .... G06V 10/774; G06V 20/70; G06V 10/764; G06V 10/82; G06F 16/951; G06T 7/40;
(Continued)

(56) References Cited

U.S. PATENT DOCUMENTS 7,853,045 B2 * 12/2010 Touati .................. G01N 15/088
                                                      702/9
9,786,065 B2 * 10/2017 Mezghani ............... G06T 7/187
                        (Continued)

FOREIGN PATENT DOCUMENTS

WO        2022154792 A1      7/2022
WO        2022238232 A1     11/2022

OTHER PUBLICATIONS

M. Á. Caja et al., "Image Processing and Machine Learning Applied to Lithology Identification, Classification and Quantification of Thin Section Cutting Samples", SPE Annual Technical Conference and Exhibition, Calgary, Alberta, Canada, Sep. 2019 (8 pages).
(Continued)

*Primary Examiner* — Avinash Yentrapati
(74) *Attorney, Agent, or Firm* — Osha Bergman Watanabe & Burton LLP

(57)          ABSTRACT

A method and a system for generating a labeled benchmark dataset are disclosed. The method includes obtaining a plurality of sources related to a thin section using web scraping and extracting a plurality of images from the plurality of sources related to the thin section, the plurality of images including a plurality of thin section images and a plurality of non-thin section images. Further, the method includes determining the plurality of thin section images from the plurality of extracted images and generating a classification of the plurality of thin section images based on a given classification criteria. The geological thin-section based machine learning models is trained based on the generated classification of the plurality of thin section images and a wellbore drilling plan is generated based on the geological thin-section based machine learning models.

20 Claims, 11 Drawing Sheets

(51) Int. Cl.

| | |
|---|---|
| *G06T 7/40* | (2017.01) |
| *G06V 10/764* | (2022.01) |
| *G06V 10/774* | (2022.01) |
| *G06V 20/70* | (2022.01) |

(52) U.S. Cl.
CPC ............ *G06V 10/764* (2022.01); *G06V 20/70* (2022.01); *G06T 2207/20084* (2013.01)

(58) Field of Classification Search
CPC . G06T 2207/20084; G06T 2207/20081; G06T 2207/30168; G06T 2207/30181; G06T 7/0002
See application file for complete search history.

(56) References Cited

U.S. PATENT DOCUMENTS

| | | | | |
|---|---|---|---|---|
| 9,892,366 | B2 | 2/2018 | Gevirtz | |
| 12,461,085 | B2 * | 11/2025 | Anifowose | ............ G01N 33/24 |
| 2021/0223427 | A1 * | 7/2021 | Dorrington | .............. G06N 3/04 |
| 2021/0264262 | A1 * | 8/2021 | Colombo | ................. G06N 3/09 |
| 2022/0036008 | A1 | 2/2022 | Cleverley | |
| 2022/0099855 | A1 * | 3/2022 | Li | ........................... G01V 1/302 |
| 2022/0207079 | A1 * | 6/2022 | Shebl | ..................... G06V 20/69 |
| 2023/0092381 | A1 * | 3/2023 | Siskind | ..................... G06T 7/73 |
| | | | | 382/103 |
| 2023/0288589 | A1 * | 9/2023 | Colombo | ............... G01V 20/00 |
| 2024/0219601 | A1 * | 7/2024 | Wang | ...................... E21B 49/02 |
| 2024/0394636 | A1 * | 11/2024 | Alnasser | ................. E21B 41/00 |
| 2024/0411046 | A1 * | 12/2024 | Al-Ghamdi | ............. E21B 49/02 |

OTHER PUBLICATIONS

P. Asmussen et al., "Semi-automatic segmentation of petrographic thin section images using a "seeded-region growing algorithm" with an application to characterize wheathered subarkose sandstone", Comuters & Geosciences, vol. 83, Issue C, Oct. 2015, pp. 89-99 (11 pages).

C. Su et al., "Rock Classification in Petrographic Thin Section Images Based On Concatenated Convolutional Neural Networks", Earth Science Informatics, 2020, vol. 13, pp. 1477-1484 (5 pages).

T. D. Jobe et al., "Geological feature prediction using image-basedmachine learning", Petrophysics, Dec. 1, 2018, pp. 1-6 (6 pages).

C. M. Albrecht et al., "AutoGeoLabel:Automated Label Generation for Geospatial Machine Learning" IEEE, Jan. 31, 2022, pp. 1-8 (8 pages).

J. Deng et al., "ImageNet: A Large-Scale Hierarchical Image Database", IEEE Computer Vision and Pattern Recognition (CVPR), 2009, pp. 1-8 (8 pages).

A. Koeshidayatullah et al., Fully automated carbonate petrography using deep convolutional neural networks:, Marine and Petroleum Geology, Dec. 2020, vol. 122, 104687, pp. 1-16 (16 pages).

Y. Lecun et al., "Deep learning" Nature, May 28, 2015, vol. 521, pp. 436-444 (10 pages).

C. Deng et al., "OpenFWI: Large-Scale Multi-Structural Benchmark Datasets for Seismic Full Waveform Inversion", 36th Conference on Neural Information Processing Systems (NeurIPS 2022) Track on Datasets and Benchmarks (36 pages).

O. Russakovsky et al., "ImageNet Large Scale Visual Recognition Challenge", International Journal of Computer Vision, 2015, pp. 1-38 (38 pages).

W Li, "Classifying geological structure elements from seismic images using deep learning", SEG Technical Program Expanded Abstracts, 2018, pp. 4643-4648 (6 pages).

* cited by examiner 210              220

210            220

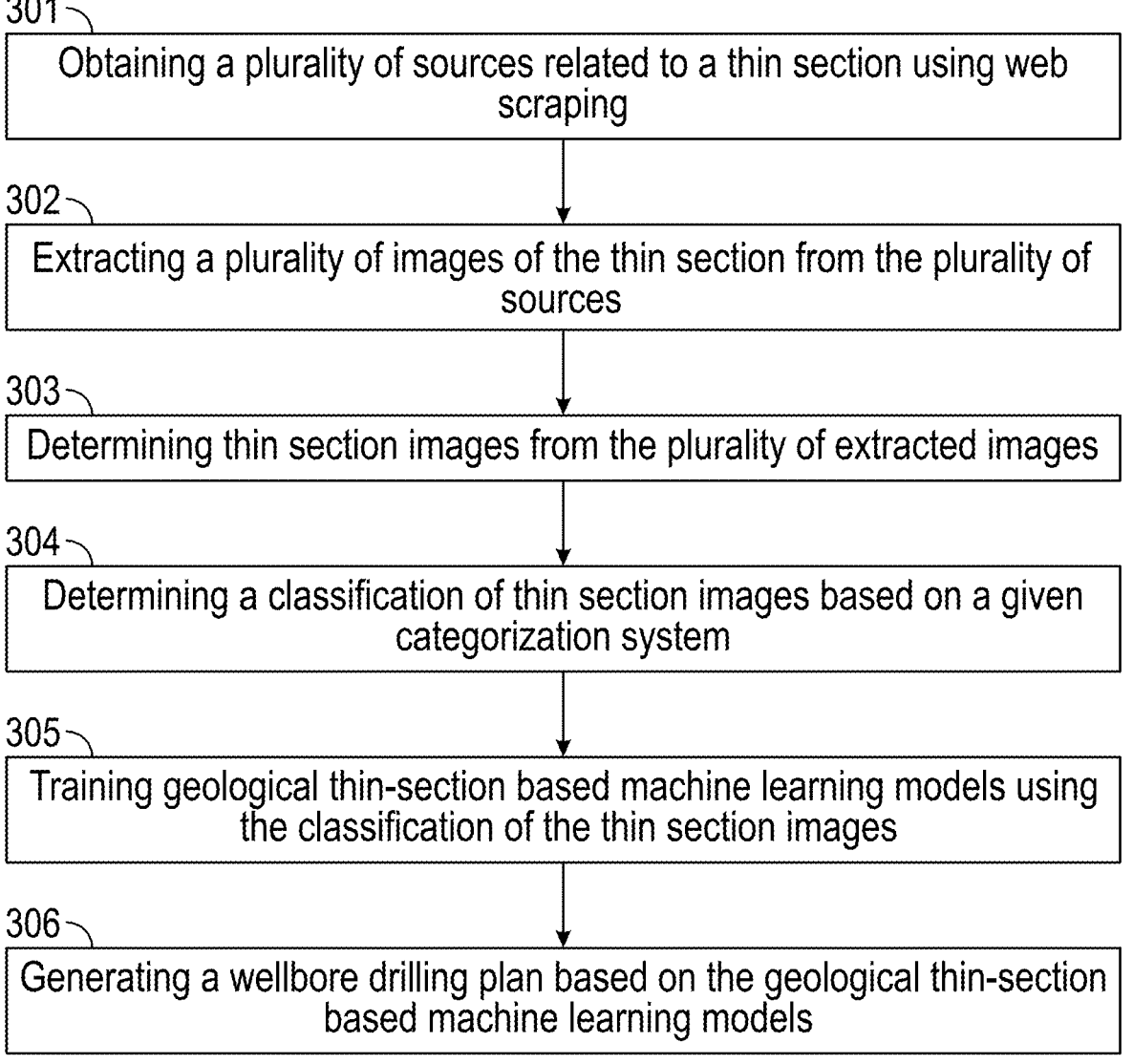

301

Obtaining a plurality of sources related to a thin section using web scraping

302

Extracting a plurality of images of the thin section from the plurality of sources

303

Determining thin section images from the plurality of extracted images

304

Determining a classification of thin section images based on a given categorization system

305

Training geological thin-section based machine learning models using the classification of the thin section images

306

Generating a wellbore drilling plan based on the geological thin-section based machine learning models

|  |  | Precision | Recall | F1-score | Support |
|---|---|---|---|---|---|
| 901 | 0 | 0.94 | 0.98 | 0.96 | 98 |
| 902 | 1 | 0.98 | 0.94 | 0.96 | 94 |
| Accuracy |  |  |  | 0.96 | 192 |
| Macro avg |  | 0.96 | 0.96 | 0.96 | 192 |
| Weighted avg |  | 0.96 | 0.96 | 0.96 | 192 |

AUTOMATED METHODS FOR GENERATING LABELED BENCHMARK DATA SET OF GEOLOGICAL THIN-SECTION IMAGES FOR MACHINE LEARNING AND GEOSPATIAL ANALYSIS

BACKGROUND

In machine learning, historically with traditional techniques as well as more so recently with deep learning, well curated benchmark data sets have played a crucial role in driving the progress of the field. For example, the well-known ImageNet data set, has been instrumental in advancing computer vision and deep learning research, especially in evaluating algorithms for object detection and image classification at large scale. However, large scale benchmark data for scientific or engineering applications that are suitable for machine learning development have only been emphasized recently, partly due to the difficulty and cost associated with collecting these sample data which often require specialized and expensive instrument as well as skilled operators and the requirement of deep subject matter expertise in generating labels for these samples both have contributed to the scarcity of high quality labeled benchmark data sets in large-scale.

While there are several benchmark geophysical data sets recently developed and made available publicly, there are no existing large-scale labeled benchmark data for geological thin section images, with the exception of the labeled benchmark data which is limited to object detection. As in the general machine learning case, such benchmark thin section data set is increasingly desirable for the development and assessment of various machine learning based geological thin-section image analysis and characterization such as segmentation, instance detection, classification, as well as the associated depositional and diagenetic characterization, and reservoir property prediction such as grain morphology, porosity, and permeability, etc.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments disclosed herein relate to a method including obtaining a plurality of sources related to a thin section using web scraping and extracting a plurality of images from the plurality of sources related to the thin section, the plurality of images including a plurality of thin section images and a plurality of non-thin section images. Further, the method includes determining the plurality of thin section images from the plurality of extracted images and generating a classification of the plurality of thin section images based on a given classification criteria. The geological thin-section based machine learning models is trained based on the generated classification of the plurality of thin section images and a wellbore drilling plan is generated based on the geological thin-section based machine learning models.

In general, in one aspect, embodiments disclosed herein relate to a non-transitory computer readable medium storing a set of instructions executable by a computer processor for generating labeled benchmark dataset. The set of instructions includes the functionality for obtaining a plurality of sources related to a thin section using web scraping and extracting a plurality of images from the plurality of sources related to the thin section, the plurality of images including a plurality of thin section images and a plurality of non-thin section images. Further, the plurality of thin section images is determined from the plurality of extracted images and a classification of the plurality of thin section images is generated based on a given classification criteria. The geological thin-section based machine learning models is trained based on the generated classification of the plurality of thin section images and a wellbore drilling plan is generated based on the geological thin-section based machine learning models.

In general, in one aspect, embodiments disclosed herein relate to a system including a processor comprising a functionality for obtaining a plurality of sources related to a thin section using web scraping and extracting a plurality of images from the plurality of sources related to the thin section, the plurality of images including a plurality of thin section images and a plurality of non-thin section images. Further, the plurality of thin section images is determined from the plurality of extracted images and a classification of the plurality of thin section images is generated based on a given classification criteria. The geological thin-section based machine learning models is trained based on the generated classification of the plurality of thin section images and a wellbore drilling plan is generated based on the geological thin-section based machine learning models.

Other aspects and advantages will be apparent from the following description and the appended claims.

BRIEF DESCRIPTION OF DRAWINGS

Wherever possible, like or identical reference numerals are used in the figures to identify common or the same elements. The figures are not necessarily to scale and certain features and certain views of the figures may be shown exaggerated in scale for purposes of clarification.

FIG. 3 shows a flowchart in accordance with one or more embodiments.

DETAILED DESCRIPTION

Figure 1:
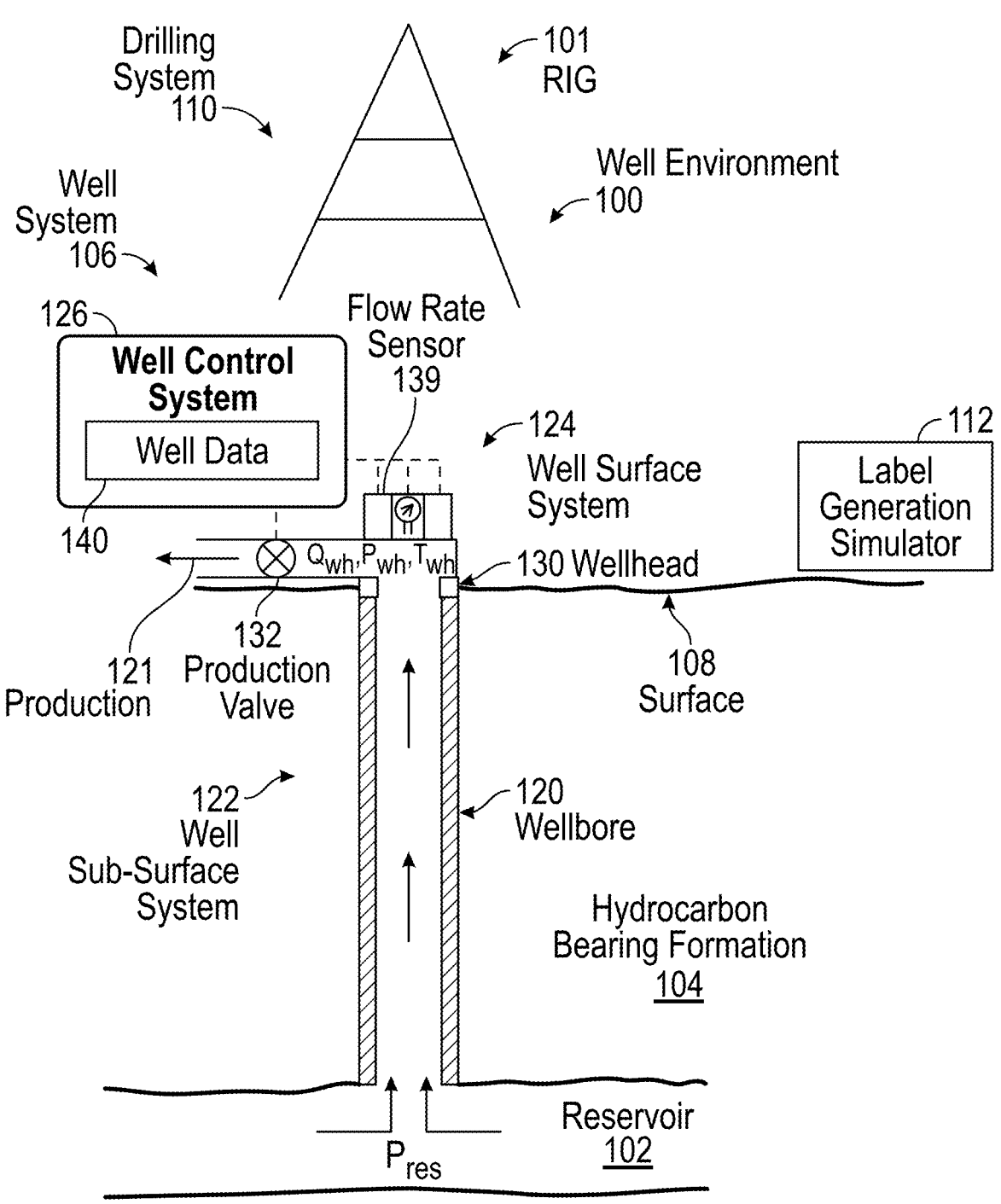
FIG. 1 shows a system according to embodiments of the present disclosure.

In the following detailed description of embodiments disclosed herein, numerous specific details are set forth in order to provide a more thorough understanding disclosed herein. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers does not imply or create a particular ordering of the elements or limit any element to being only a single element unless expressly disclosed, such as by the use of the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

In the following description of FIGS. 1-10, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described with regard to a corresponding like-named component in any other figure.

It is to be understood that the singular forms "a," "an," and "the" include plural referents unless the context clearly dictates otherwise. Thus, for example, reference to "a horizontal beam" includes reference to one or more of such beams.

Terms such as "approximately," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is to be understood that one or more of the steps shown in the flowcharts may be omitted, repeated, and/or performed in a different order than the order shown. Accordingly, the scope disclosed herein should not be considered limited to the specific arrangement of steps shown in the flowcharts.

Although multiple dependent claims are not introduced, it would be apparent to one of ordinary skill that the subject matter of the dependent claims of one or more embodiments may be combined with other dependent claims.

Embodiments disclosed herein provide a method and system for labeled benchmark data set generation. Specifically, the method uses web scraping methods to obtain a plurality of documents that contain images related to thin section images. In one or more embodiments, the web scraping may be performed on a plurality of websites, the published literature libraries, or any other content available digitally. More specifically, embodiments disclosed herein relate to developing an end-to-end complete workflow and methodology for creating machine learning benchmark data sets of geological thin-section sample images. Thin section images are important in exploration for reconstructing paleoenvironment and predicting reservoir facies, in reservoir characterization and development, and assessment of the reservoir quality.

In one or more embodiments, this method may be implemented on already existing hardware packages as a plug-in module. The plug-in module may be deployed on the existing analytics setup. Initially the hardware package may be deployed as a standalone setup, with an interface provided to the user to run Graphical User Interface (GUI). That ensures that the development and roll-out phase of the project are easier to implement, without requiring a permanent rig fixture. Alternatively, the system may be integrated directly to the rig.

Further, embodiments disclosed herein enable a user to operate from a distance, without an effect on normal operations. The method uses techniques including modelling and software based on artificial intelligence (AI) models, including machine learning and deep learning, for image and video processing. The images and data obtained by a labeled benchmark data set generation simulator are fed into processing systems that initially extract images from the original documents. Further, the thin section images are determined from a plurality of extracted images and a classification of the thin section images is generated based on a categorization system.

FIG. 1 shows a schematic diagram in accordance with one or more embodiments. As shown in FIG. 1, a well environment (100) includes a hydrocarbon reservoir ("reservoir") (102) located in a subsurface hydrocarbon-bearing formation ("formation") (104) and a well system (106). The hydrocarbon-bearing formation (104) may include a porous or fractured rock formation that resides underground, beneath a geological surface ("surface") (108). In the case of the well system (106) being a hydrocarbon well, the reservoir (102) may include a portion of the hydrocarbon-bearing formation (104). The hydrocarbon-bearing formation (104) and the reservoir (102) may include different layers of rock having varying characteristics, such as varying degrees of permeability, porosity, capillary pressure, and resistivity. In the case of the well system (106) being operated as a production well, the well system (106) may facilitate the extraction of hydrocarbons (or "production") from the reservoir (102).

In some embodiments, the well system (106) includes a rig (101), a drilling system (110), a labeled benchmark data set generation simulator (112), a wellbore (120), a well sub-surface system (122), a well surface system (124), and a well control system ("control system") (126). The drilling system (110) may include a drill string, a drill bit, and a mud circulation system for use in drilling the wellbore (120) into the formation (104). The well control system (126) may control various operations of the well system (106), such as well production operations, well drilling operation, well completion operations, well maintenance operations, and reservoir monitoring, assessment and development operations. In some embodiments, the well control system (126) includes a computer system that is the same as or similar to that of a computer system (1000) described below in FIG. 10 and the accompanying description.

The rig (101) is a combination of equipment used to drill a borehole to form the wellbore (120). Major components of the rig (101) include the drilling fluid tanks, the drilling fluid pumps (e.g., rig mixing pumps), the derrick or mast, the draw works, the rotary table or top drive, the drill string, the power generation equipment and auxiliary equipment.

The wellbore (120) includes a bored hole (i.e., borehole) that extends from the surface (108) into a target zone of the hydrocarbon-bearing formation (104), such as the reservoir (102). An upper end of the wellbore (120), terminating at or near the surface (108), may be referred to as the "up-hole" end of the wellbore (120), and a lower end of the wellbore, terminating in the hydrocarbon-bearing formation (104), may be referred to as the "downhole" end of the wellbore (120). The wellbore (120) may facilitate the circulation of drilling fluids during drilling operations, flow of hydrocarbon production ("production") (121) (e.g., oil and gas) from the reservoir (102) to the surface (108) during production operations, the injection of substances (e.g., water) into the hydrocarbon-bearing formation (104) or the reservoir (102) during injection operations, or the communication of monitoring devices (e.g., logging tools) lowered into the hydrocarbon-bearing formation (104) or the reservoir (102) during monitoring operations (e.g., during in situ logging operations).

In some embodiments, during operation of the well system (106), the well control system (126) collects and records well data (140) for the well system (106). During drilling operation of the well (106), the well data (140) may include mud properties, flow rates measured by a flow rate sensor (139), drill volume and penetration rates, formation characteristics, etc. To drill a subterranean well or wellbore (120), a drill string (110), including a drill bit and drill collars to weight the drill bit, may be inserted into a pre-drilled hole and rotated to cut into the rock at the bottom of the hole, producing rock cuttings. Commonly, the drilling fluid, or drilling mud, may be utilized during the drilling process. To remove the rock cuttings from the bottom of the wellbore (120), drilling fluid is pumped down through the drill string (110) to the drill bit. The drilling fluid may cool and lubricate the drill bit and provide hydrostatic pressure in the wellbore (120) to provide support to the sidewalls of the wellbore (120). The drilling fluid may also prevent the sidewalls from collapsing and caving in on the drill string (110) and prevent fluids in the downhole formations from flowing into the wellbore (120) during drilling operations. Additionally, the drilling fluid may lift the rock cuttings away from the drill bit and upwards as the drilling fluid is recirculated back to the surface. The drilling fluid may transport rock cuttings from the drill bit to the surface, which can be referred to as "cleaning" the wellbore (120), or hole cleaning.

In some embodiments, the well data (140) are recorded in real-time, and are available for review or use within seconds, minutes, or hours of the condition being sensed (e.g., the measurements are available within 1 hour of the condition being sensed). In such an embodiment, the well data (140) may be referred to as "real-time" well data (140). Real-time well data (140) may enable an operator of the well (106) to assess a relatively current state of the well system (106) and make real-time decisions regarding a development of the well system (106) and the reservoir (102), such as on-demand adjustments in drilling fluid and regulation of production flow from the well.

In some embodiments, the well surface system (124) includes a wellhead (130). The wellhead (130) may include a rigid structure installed at the "up-hole" end of the wellbore (120), at or near where the wellbore (120) terminates at the geological surface (108). The wellhead (130) may include structures for supporting (or "hanging") casing and production tubing extending into the wellbore (120). Production (121) may flow through the wellhead (130), after exiting the wellbore (120) and the well sub-surface system (122), including, for example, the casing and the production tubing. In some embodiments, the well surface system (124) includes flow regulating devices that are operable to control the flow of substances into and out of the wellbore (120). For example, the well surface system (124) may include one or more production valves (132) that are operable to control the flow of production (121). For example, a production valve (132) may be fully opened to enable the unrestricted flow of production (121) from the wellbore (120), the production valve (132) may be partially opened to partially restrict (or "throttle") the flow of production (121) from the wellbore (120), and production valve (132) may be fully closed to fully restrict (or "block") the flow of production (121) from the wellbore (120), and through the well surface system (124).

In some embodiments, the wellhead (130) includes a choke assembly. For example, the choke assembly may include hardware with functionality for opening and closing the fluid flow through pipes in the well system (106). Likewise, the choke assembly may include a pipe manifold that may lower the pressure of fluid traversing the wellhead. As such, the choke assembly may include a set of high-pressure valves and at least two chokes. These chokes may be fixed or adjustable or a mix of both. Redundancy may be provided so that if one choke has to be taken out of service, the flow can be directed through another choke. In some embodiments, pressure valves and chokes are communicatively coupled to the well control system (126). Accordingly, a well control system (126) may obtain wellhead data regarding the choke assembly as well as transmit one or more commands to components within the choke assembly in order to adjust one or more choke assembly parameters.

Further, the labeled benchmark data set generation simulator (112) may be located anywhere at the drilling site or in a cloud infrastructure. Any combination of mobile, desktop, server, router, switch, embedded device, or other types of hardware may be used for the labeled benchmark data set generation simulator (112). For example, the labeled benchmark data set generation simulator (112) may include one or more computer processors, non-persistent storage (e.g., volatile memory, such as random access memory (RAM), cache memory), persistent storage (e.g., a hard disk, an optical drive such as a compact disk (CD) drive or digital versatile disk (DVD) drive, a flash memory, etc.), a communication interface (e.g., Bluetooth interface, infrared interface, network interface, optical interface, etc.), and numerous other elements and functionalities.

In one or more embodiments, the labeled benchmark data set generation simulator (112) may include hardware and/or software with functionality for analyzing the obtained images. Further, the labeled benchmark data set generation simulator (112) may store, at least, the previously obtained sources, extracted images related to a thin section, and data generated during the benchmark generation process. For this purpose, the simulator may include memory with one or more data structures, such as a buffer, a table, an array, or any other suitable storage medium. The labeled benchmark data set generation simulator (112) may further, at least, generate a labeled benchmark data set of geological thin sections. While labeled benchmark data set generation simulator (112) is shown at a well site, in some embodiments, the labeled benchmark data set generation simulator (112) may be located remotely from well site. In some embodiments, labeled benchmark data set generation simulator (112) may include a computer system that is similar to the computer system (1000) described below with regard to FIG. 10 and the accompanying description.

Figure 2A:
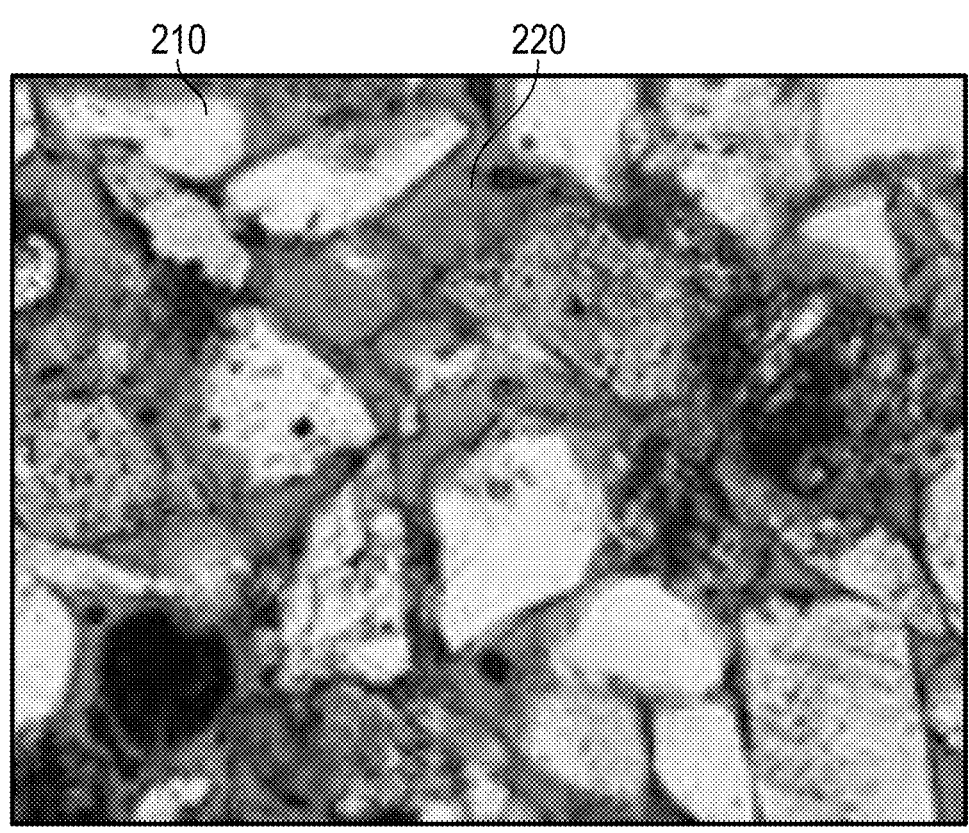
FIGS. 2A and 2B show examples of thin sections according to embodiments of the present disclosure.
Figure 2B:
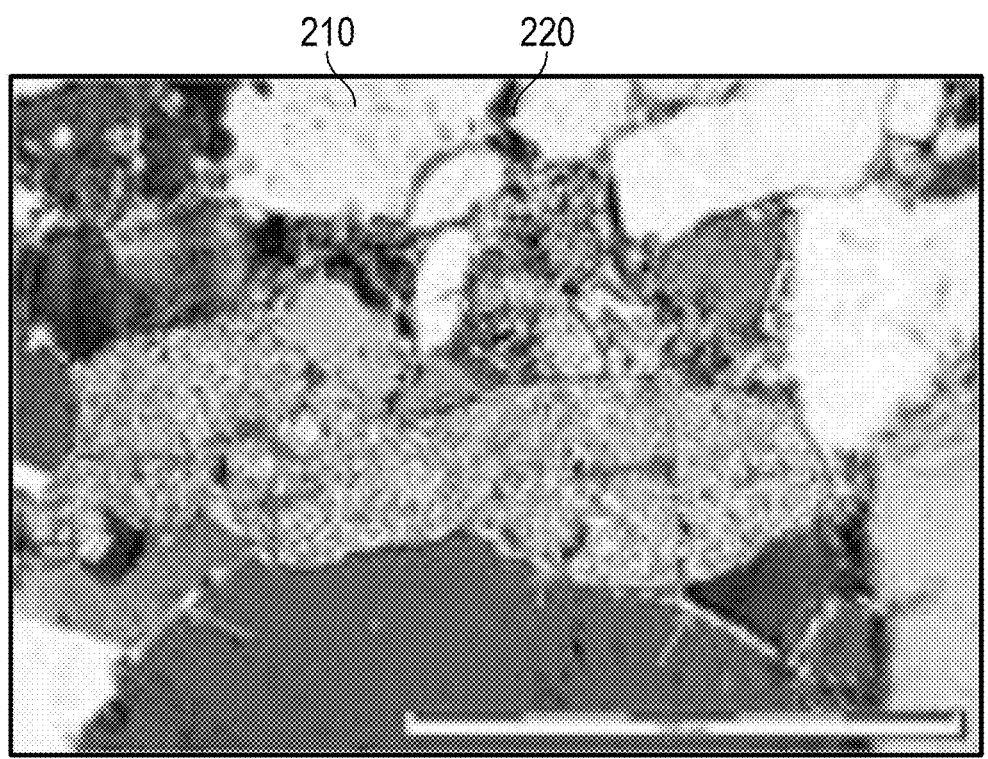

FIGS. 2A and 2B show examples of thin sections including mineral grains (210) and groundmass (220). A thin section is a thin slice of a rock sliced to approximately 30 microns and mounted on a glass slide. The thin sections show the mineral grain (210) with a grain boundaries, shape, and arrangement of grains which provide information about rock's texture, mineralogy, and geological history. Further, the mineral grains (210) are surrounded with the groundmass (220) that fills the space between the mineral grains (210). The groundmass may consist of a plurality of substances including fine-grained sediment particles including clay, slit, and sand.

The thin section enables examination of the internal structure and composition of the rock under a microscope. The thin sections may be used to examine mineralogy, texture, and different properties of rocks used to identify the rocks and provide insights into rock's quality and formation. Additionally, the thin sections may be analyzed using various methods, including a polarized light microscopy, the polarized light microscopy examining the optical properties of the thin sections.

In one or more embodiments, thin sections may be used for oil and gas exploration. Specifically, thin section analysis may be used to analyze oil and gas deposits, provide information about the porosity and permeability of rocks and storage of hydrocarbons. Additionally, the thin sections may be used in construction. The thin sections may be examined to understand the properties of the rock such as strength and stability which are used in designing foundations and structural design of the constructions.

FIG. 3 shows a flowchart in accordance with one or more embodiments for labeled benchmark data set generation. Specifically, in Block 301, a plurality of sources related to the thin section are obtained using various web scraping techniques. The plurality of sources related to the thin section include, at least, websites and scientific literature that contain images and mention or relate to thin sections. For purposes of this disclosure, "web scraping" or "scraping" refers to extracting information from one or more websites using Hypertext Transfer Protocol (HTTP), via integration with a web browser, and/or any other method of obtaining information from a website known in the art. In one or more embodiments of the invention, the labeled benchmark data set generation simulator (112) may be used to scrape or extract content from the web.

Figure 4:
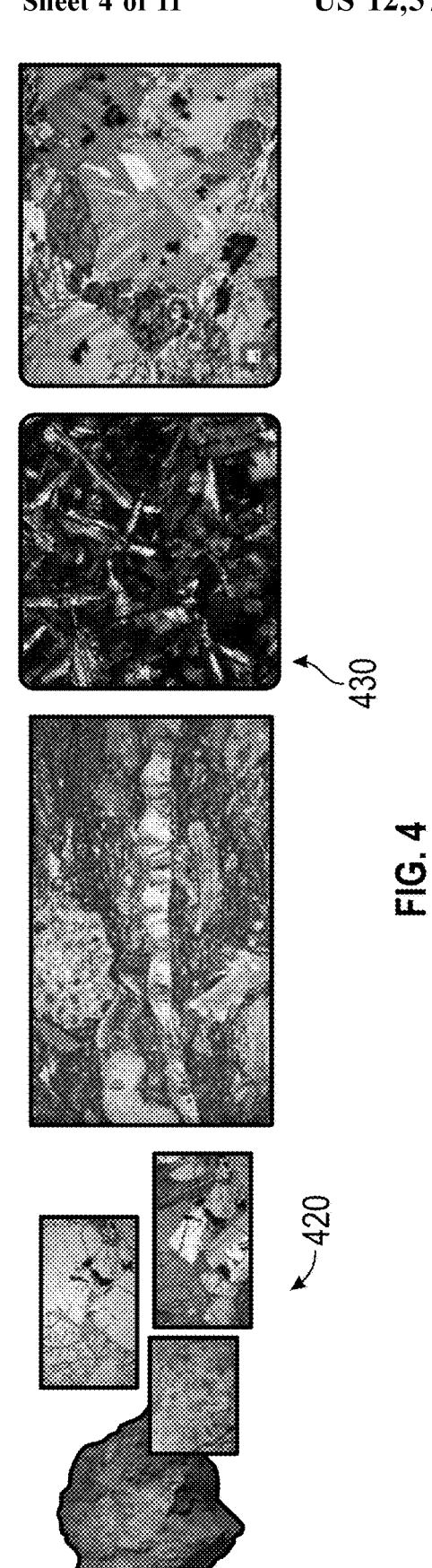
FIG. 4 shows an example of web scraping according to embodiments of the present disclosure.

As shown in FIG. 4, the process of web scraping is configured to search websites using a set of parameters and download the webpages that contain the thin section images (410). Specifically, the parameters include defining target websites that need to be scraped, data fields that need to be scraped from a website (e.g., images (410), image labels, text (420), links (430)), data structures in which the scraped information will be exported to (e.g., PDF file, Comma Separated Values (CSV) file, a database), and volume of the scraped data.

In one or more embodiments, the images may be saved as separate PDF files. Further, each keyword may be saved to a new directory, into which the PDF files are saved in. The source citation trace may be preserved using a reference management and a folder and file naming convention. For all new keywords, the labeled benchmark data set generation simulator (112) may create new folders where the scraping results for that keyword are saved.

Additionally, the labeled benchmark data set generation simulator (112) is configured to perform web scraping of online published literature libraries. Specifically, the labeled benchmark data set generation simulator (112) download articles using a list of keywords, according to the specific requirements of the online library. Further, the labeled benchmark data set generation simulator (112) specified keywords and download the articles in the specified download directory. For example, the labeled benchmark data set generation simulator (112) may use a link to the results of a literature library's search website and redirect to a results webpage with the searched phrase together with the phrase "thin section." Each resulting page is scraped and the articles on that page are saved into the specified folders.

In one or more embodiments, every saved image has a source citation trace. The trace may be preserved using reference management and a folder and file naming convention. For example, URL trace refers to the process of tracing the path of a URL from the user's web browser to the destination of the thin section image on the internet.

In Block 302, images are extracted from the obtained sources by the labeled benchmark data set generation simulator (112). In one or more embodiments, the image, captions, and URL address are extracted from individual PDF files. The PDF files are saved in batch in a PDF files and the captions and the URL address are saved in a CSV file. Further, each PDF file is assigned a unique name and a download identification number, to trach the source of the images. For example, a PDF file may be named PDF_PDFNumber, where PDFNumber represents a number in order the PDF file was created. Further, the images may be named as PDFNumber_ImageNumber. The captions are organized according to the unique identification numbers, the unique identification numbers being assigned according to the related image identification number.

In one or more embodiments, the images may be filtered to remove the images that do not satisfy the requirements of the thin section specification such as the resolution, image format, color accuracy, sharpness, focus, and a file size. For example, the labeled benchmark data set generation simulator (112) may automatically remove images with dimension less than 100×100 pixels or bigger than 2000×2200 pixels. Further, obtained PDF files with no extractable images also may be removed. In some embodiments, the images may be filtered for, at least, images that contain the extracted captions, the proper common English words, or the proper geological keywords. More parameters that are important for creating a label may be used to filter the images and PDF files.

In Block 303, images are filtered by the labeled benchmark data set generation simulator (112). In one or more embodiments, the images are filtered using a machine learning model. The machine learning model may be pretrained on data on thin section images. The machine learning model may be based on any type of machine learning technique. For example, perceptrons, convolutional neural networks, deep neural networks, recurrent neural networks, support vector machines, decision trees, inductive learning models, deductive learning models, reinforcement learning models, etc. may be used. In some embodiments, two or more different types of machine-learning models are integrated into a single machine-learning architecture, e.g., a machine-learning model may include support vector machines and neural networks.

In some embodiments, various types of machine learning algorithms, e.g., backpropagation algorithms, may be used to train the machine learning models. In a backpropagation algorithm, gradients are computed for each hidden layer of a neural network in reverse from the layer closest to the output layer proceeding to the layer closest to the input layer. As such, a gradient may be calculated using the transpose of the weights of a respective hidden layer based on an error function (also called a "loss function"). The error function may be based on various criteria, such as mean squared error function, a similarity function, etc., where the error function may be used as a feedback mechanism for tuning weights in the machine-learning model. In some embodiments, historical data (e.g., production data recorded over time) may be augmented to generate synthetic data for training a machine learning model.

With respect to neural networks, for example, a neural network may include one or more hidden layers, where a hidden layer includes one or more neurons. A neuron may be a modelling node or object that is loosely patterned on a neuron of the human brain. In particular, a neuron may combine data inputs with a set of coefficients, i.e., a set of network weights for adjusting the data inputs. These network weights may amplify or reduce the value of a particular data input, thereby assigning an amount of significance to various data inputs for a task being modeled. Through machine learning, a neural network may determine which data inputs should receive greater priority in determining one or more specified outputs of the neural network. Likewise, these weighted data inputs may be summed such that this sum is communicated through a neuron's activation function to other hidden layers within the neural network. As such, the activation function may determine whether and to what extent an output of a neuron progresses to other neurons where the output may be weighted again for use as an input to the next hidden layer. In some embodiments, a convolutional neural network (CNN) may a deep learning model used for image classification, object recognition, and related computer vision solutions. The CNN, in convolutional layer, applies filters to the obtained image, allowing the neural network to learn local patterns and features of an obtained image. Further, pooling layers of the CNN may down sample two dimensional arrays that containing the output of the convolutional layer, with each result corresponding to a specific feature of the obtained image. Fully connected layers of the CNN process the output of the convolutional and pooling layers to generate a resulting prediction.

Training the CNN model may include the forward propagation of input data through the convolutional, pooling and fully connected layers, where the CNN model computes the error between the predicted output and the measured output (e.g., whether the obtained image is related to the thin section). Further, the CNN backpropagates the error through the convolutional, pooling and fully connected layers and updating the assigned weights of the network. Training the CNN model may an iterative process that overall improves with a large number of iterations.

In some embodiments, one or more ensemble learning methods may be used in connection to the machine-learning models. For example, an ensemble learning method may use multiple types of machine-learning models to obtain better predictive performance than available with a single machine-learning model. In some embodiments, for example, an ensemble architecture may combine multiple base models to produce a single machine-learning model. One example of an ensemble learning method is a BAGGing model (i.e., BAGGing refers to a model that performs Bootstrapping and Aggregation operations) that combines predictions from multiple neural networks to add a bias that reduces variance of a single trained neural network model. Another ensemble learning method includes a stacking method, which may involve fitting many different model types on the same data and using another machine-learning model to combine various predictions.

The selection of the machine learning model may involve selecting the machine learning model with the best performance based on the training of the method. The machine learning model with the best performance may be identified through repeated execution of steps using different machine learning models, until the best-performing machine learning model is identified.

The machine learning model analyzes the obtained images to identify whether an image depicts the thin section. In one or more embodiments, the machine learning model analyzes the obtained images to identify the thin section and assign certainty of the analysis. The assigned certainty may be expressed using a plurality of scales including a percentage or a scale from 0 to 1. In one or more embodiments, the user may determine the threshold required for the image to be considered acceptable and let the image proceed to the next step. Initially, the machine learning model is trained on training labeled data. In the event that the output of the machine learning model is below the predetermined threshold or when the obtained image cannot be recognized by the machine learning model, the labeled benchmark data set generation simulator (112) rejects the image. Alternatively, the image is allowed to proceed to the next step.

Figure 5:
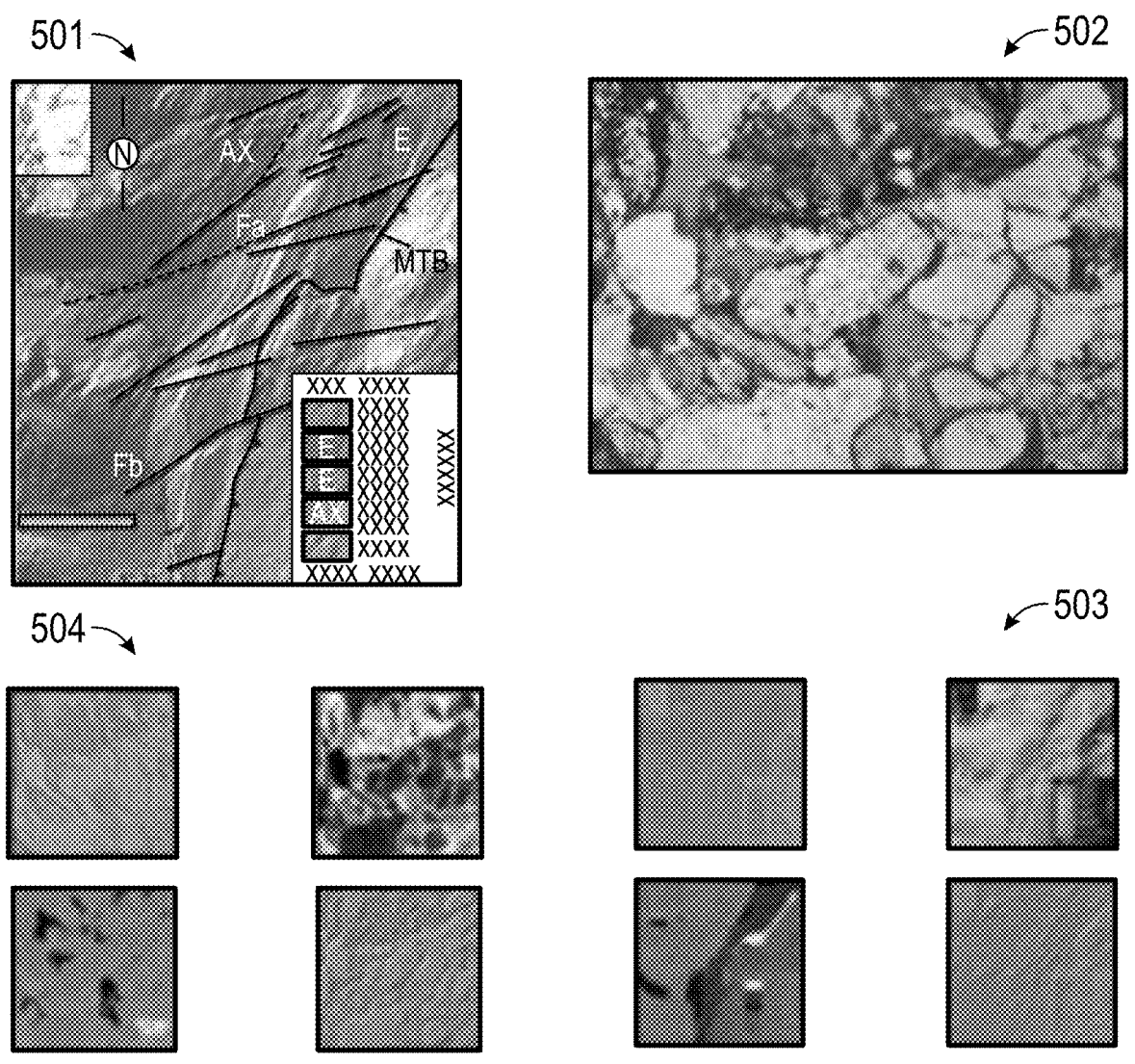
FIG. 5 shows examples of determined thin and non-thin sections according to embodiments of the present disclosure.

FIG. 5 shows examples of images in accordance with one or more embodiments. For example, FIG. 5 shows an example of an image (501) that is not recognized as a thin section by the machine learning model and its respective features (503). Alternatively, image (502) is an example of an image that is recognized as a thin section by the machine learning model and its respective features (504).

In one or more embodiments, after the filtering process, the rejected images (e.g., image (501)) are removed from the process. However, it is necessary to organize a file containing the captions to reflect the change caused by the filtering process. As such, a file containing the captions is sanitized to delete the saved captions of the removed images. In one or more embodiments, the sanitation of the images may be performed by organizing allowed images into a single or multiple directories and comparing the identification number of a caption with an identification number of the corresponding image. The matching thin section captions may be copied to a new document containing only sanitized captions, and the original saved captions file may remain unmodified.

In one or more embodiments, the filtering process including scraping PDFs from similar key-terms, may result in obtaining identical images with different captions. As such, it is important to reduce redundant work that includes re-filtering the images multiple times. Therefore, the filtering process may remove duplicate images by assigning each images a unique hash by using the value of image's pixels as an input to a hash function. When the process finds multiple images of the same hash value, it allows only one image and rejects the duplicates.

In Block 304, the images are classified using the machine learning model. In one or more embodiments, an iterative classification may be applied with a loss associated with samples with high confidence from previous iterations. The loss associated with samples with high confidence from previous iterations may be weighted more favorably to refine and improve the quality of the classification and labels. The labels are assigned to each image and saved to a labeled benchmark dataset.

Further, in Block 305 the plurality of images classified with labels are used to train and test geological thin section based machine learning models. The geological thin section based machine learning models may be trained to analyze segmentation, instance detection, classification, as well as the associated depositional and diagenetic characterization, and reservoir property prediction such as grain morphology, porosity, and permeability.

In Block 306, the geological thin section based machine learning models may be used directly to create a wellbore drilling plan using a wellbore planning system. Such a wellbore drilling plan may contain drilling targets including geological regions expected to contain hydrocarbons. The wellbore planning system may plan wellbore trajectories to reach the drilling targets while simultaneously avoiding drilling hazard, such as preexisting wellbores, shallow gas pockets, and fault zones, and not exceeding the constraints, such as torque, drag and wellbore curvature, of the drilling system. Similarly, the wellbore drilling plan may include a determination of wellbore caliper, and casing points.

Figure 10:
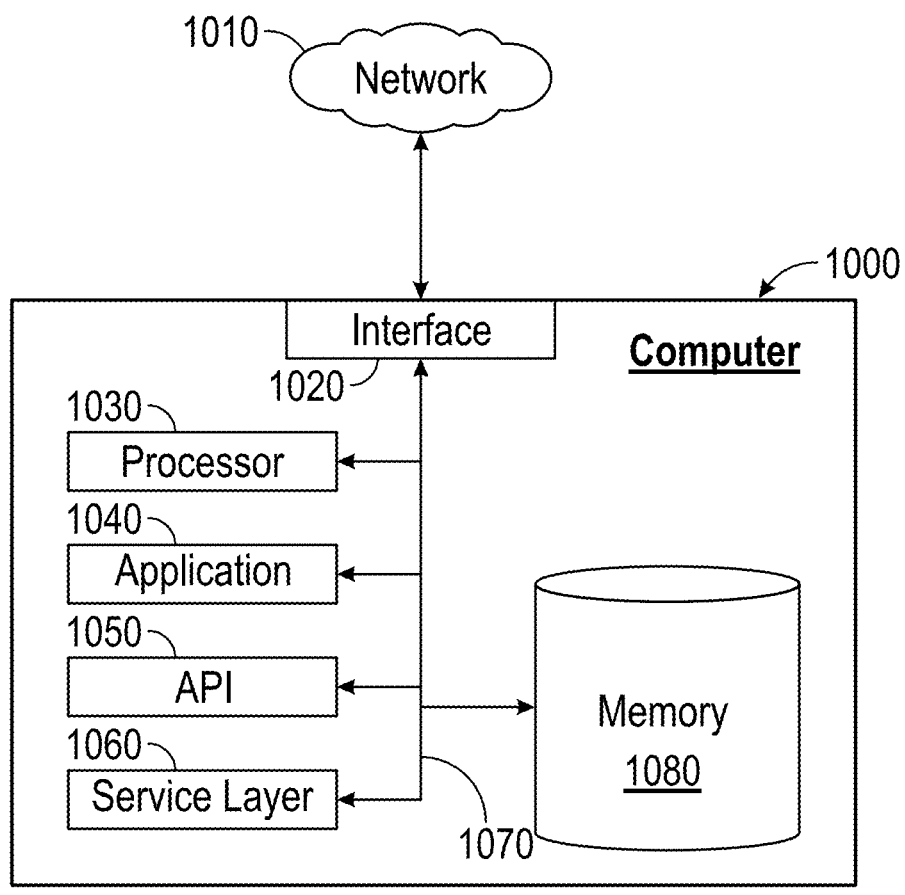
FIG. 10 shows a computer system in accordance with one or more embodiments.

The wellbore planning system may include dedicated software stored on a memory of a computer system, such as the computer system shown in FIG. 10. The wellbore plan may be informed by the best available information at the time of planning. This may include models encapsulating subterranean stress conditions, the trajectory of any existing wellbores (which may be desirable to avoid), and the existence of other drilling hazards, such as shallow gas pockets, over-pressure zones, and active fault planes.

The wellbore plan may further define associated drilling parameters, such as the planned depths at which casing will be inserted to support the wellbore to prevent formation fluids entering the wellbore and the drilling mud weights (densities) and types that may be used during drilling of the wellbore.

In other embodiments, the classified labeled images may be input to a reservoir simulator. A reservoir simulator comprises functionality for simulating the flow of fluids, including hydrocarbon fluids such as oil and gas, through a hydrocarbon reservoir composed of porous, permeable reservoir rocks in response to natural and anthropogenic pressure gradients. The reservoir simulator may be used to predict changes in fluid flow, including fluid flow into well penetrating the reservoir as a result of planned well drilling, and fluid injection and extraction. For example, the reservoir simulator may be used to predict fluid-flow and production scenarios including changes in hydrocarbon production rate that would result from the injection of water into the reservoir from wells around the reservoirs periphery.

Figure 6:
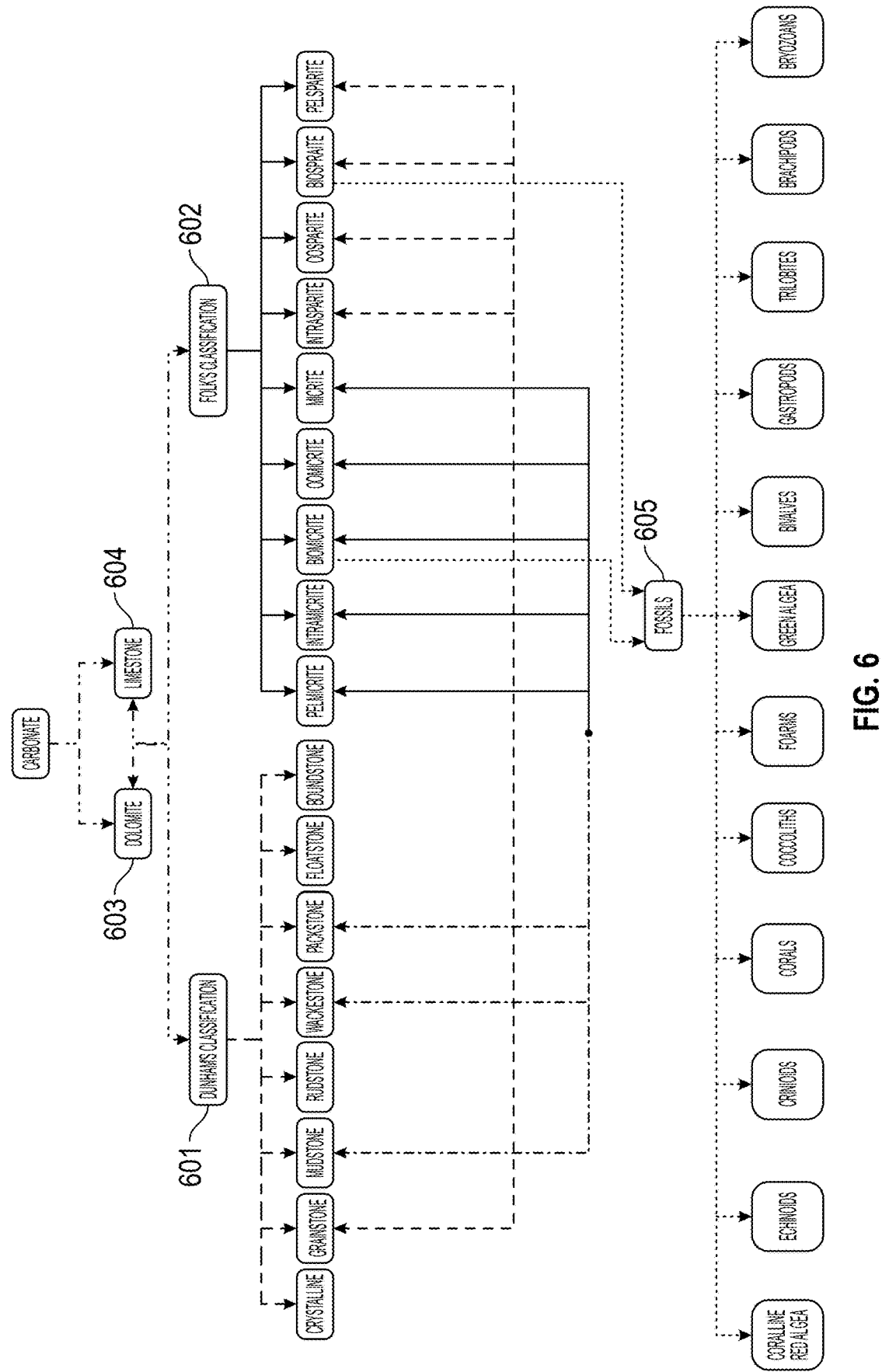
FIG. 6 shows an example of classification criteria according to embodiments of the present disclosure.
Figure 7:
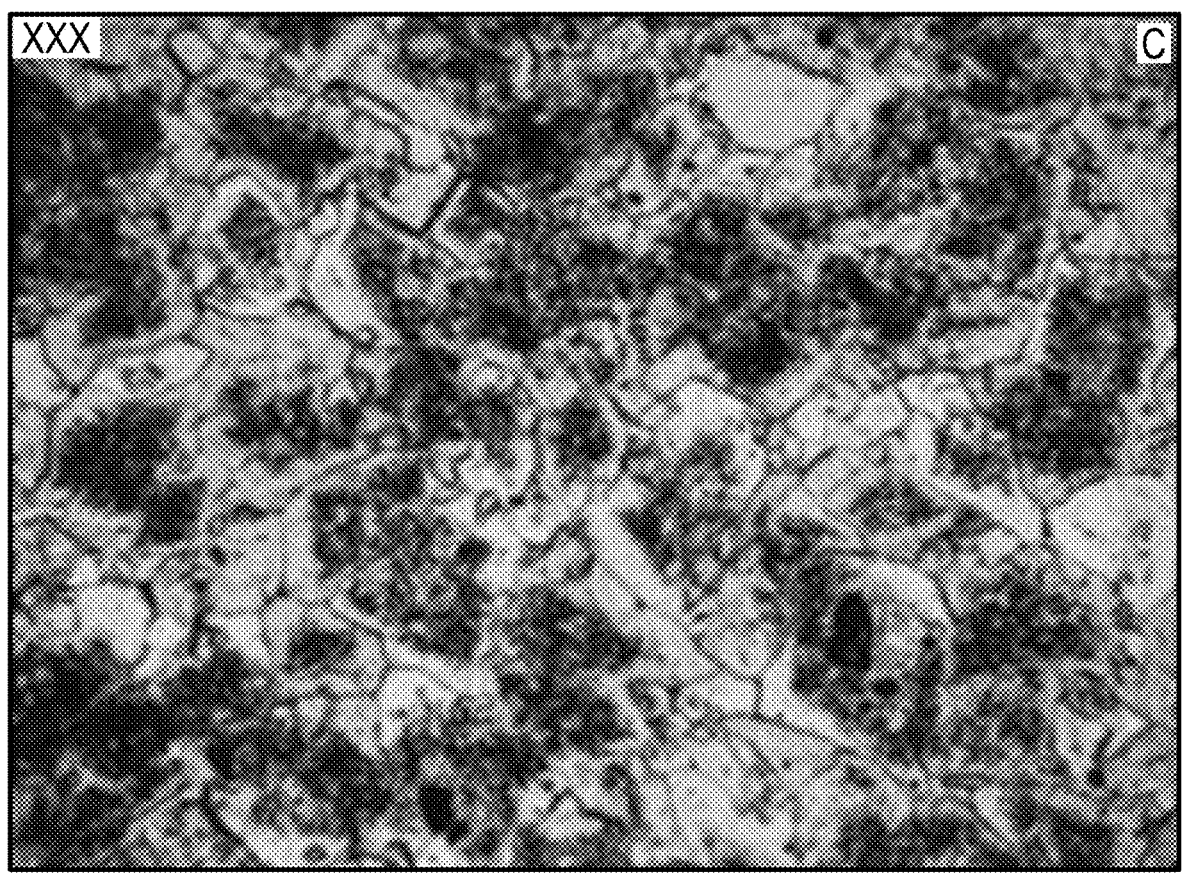
FIG. 7 shows an example of classified thin section according to embodiments of the present disclosure.

As shown in FIG. 6, the classification may be designed for a variety of rock types associated with different geological characterization semantics. In one or more embodiments, the classification module for sedimentary rock classification, shown in FIG. 6, illustrates the potential combinations of three parallel classification criteria including texture such as Dunham (601) and Folk (602), mineralogy, such as dolomite (603), limestone (604), and fossils (605). Therefore, as shown in FIG. 7 a rock may be classified as various combinations of different outcomes of each criterion (e.g., dolomitic wackstone with bivalve fossils, oolitic grainstone, gastropod bivalve calcitic packstone). However, certain combinations may not be geologically possible.

In one or more embodiments, when dealing with a large number of variations of rock types, a plurality of classification groups may be used based on a plurality of attributes. According to multiple types of classification, classification labels may be saved in a single file, in multiple files, or the classification labels may be saved as a property of the image file. Saving the classification label as the property of the image file enables embedding the class label with image meta data with respectively. For exemplary purposes, the class label may be saved as a custom Extensible Metadata Platform (XMP) attributes in the image file. Alternatively, all images may be converted to an image format that supports metadata information (e.g., Open Microscopy Environment Tagged Image File Format).

Figure 8A:
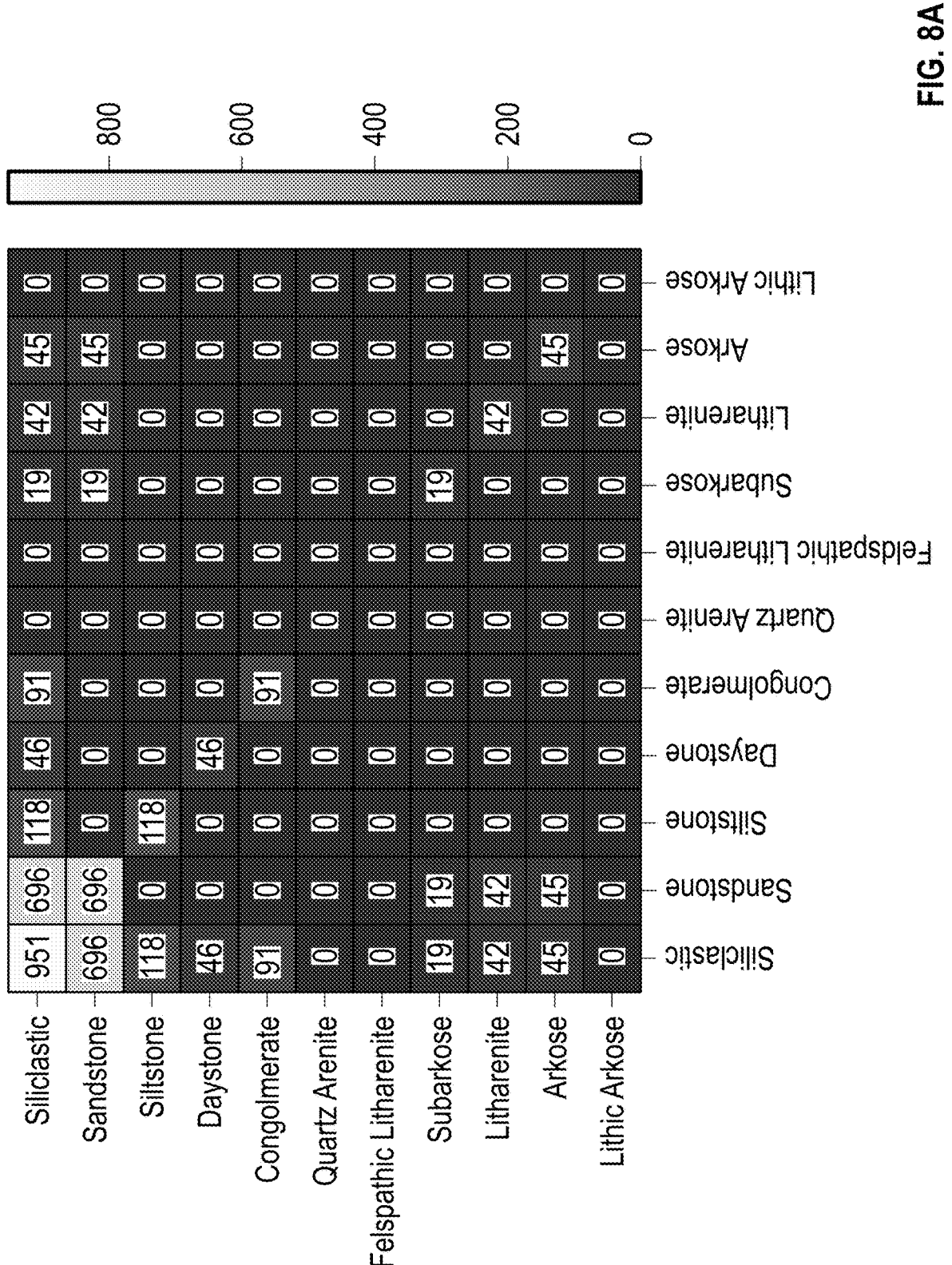
FIGS. 8A and 8B show a plot of the label for overlapping matrices for different rocks according to embodiments of the present disclosure.
Figure 8B:
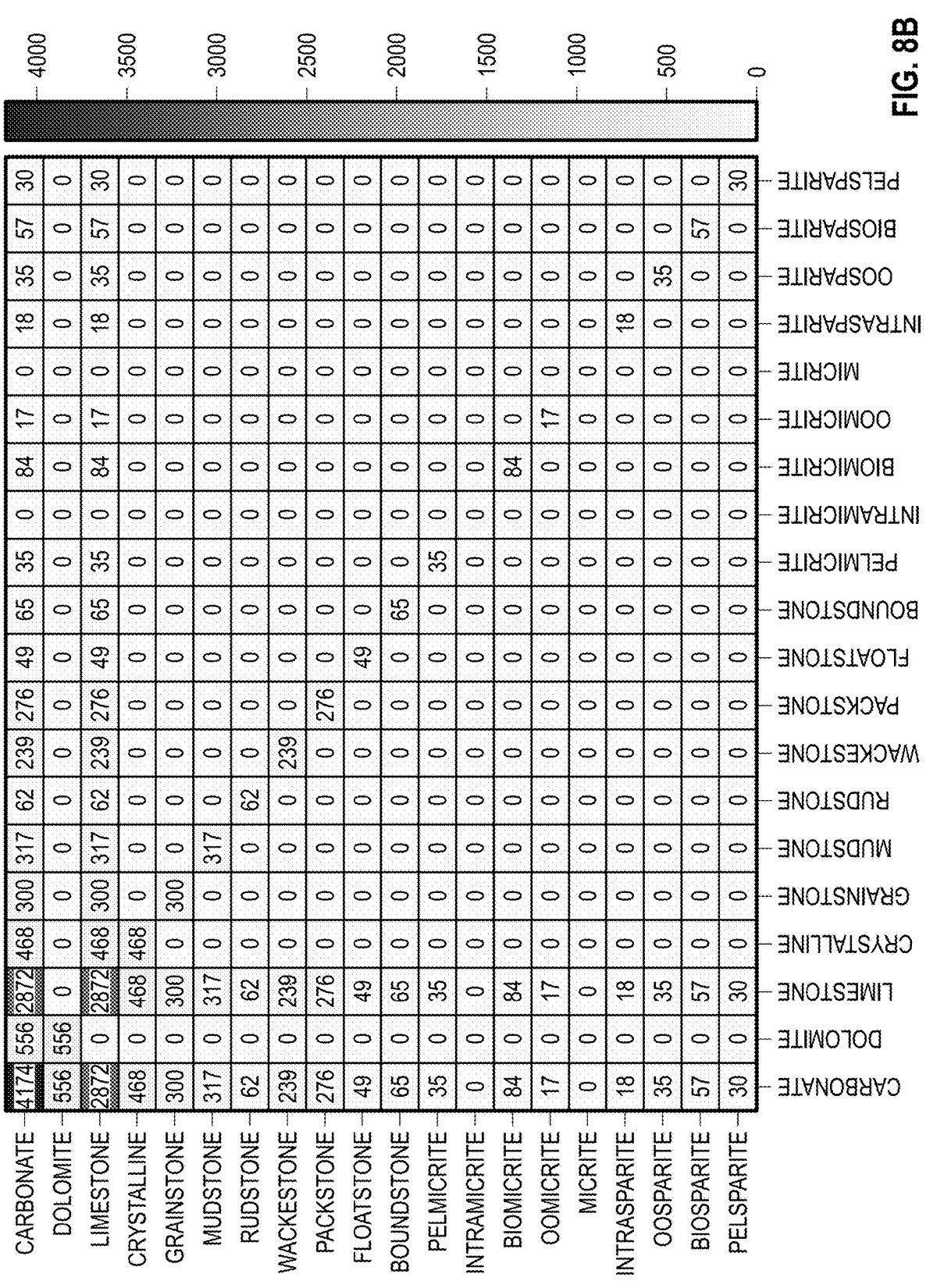

Further, the machine learning model may take images from sorted directories and sort them in a hierarchical order to make the process of deep learning easier, due to the complexity of the classification problem. Specifically, FIGS. 8A and 8B plot the label overlapping matrices for silliclastic and carbonate rocks, following the categorization in FIG. 6. The two category distributions convey the non-exclusiveness, or non-orthogonality in the labeling categorization from Dunham and Folk classification schemes. The off-diagonal pattern shows the overlap.

Additionally, the rock sample data may be severely imbalanced in their class representation, as some rock types are more common than others. In one or more embodiments, several class balancing techniques such as using upsampling the minority class, downsampling the majority or focal-loss may be used. Specifically, upsampling may include increasing the number of data points without introducing new information, therefore enhancing the quality of data to match the resolution of other data sets. Alternatively, downsampling includes reducing the data points in a data set, while preserving the information and characteristics of the original data set. Further, focal-loss addresses an issue of class imbalance by assigning higher weights to misclassified examples from minority classes.

Figures 9A, 9B:
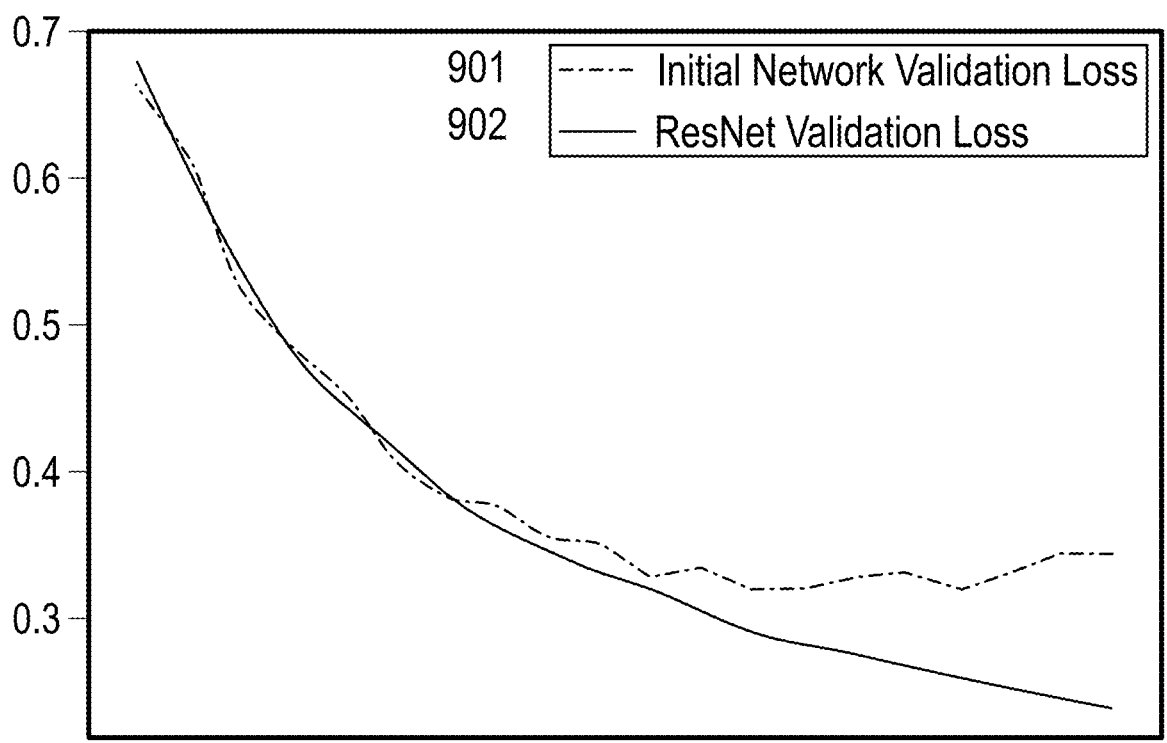
FIGS. 9A and 9B show the thin section image classification performance for training and validation according to embodiments of the present disclosure.

FIGS. 9A and 9B shows the thin section image classification learning curve for both training (901) and validation (902). An x-axis represents time and y-axis represents improvement. Generally, the metric used to evaluate learning may be minimizing such as loss or error where better scores indicate more learning and a value of 0.0 indicates that the training dataset was learned perfectly, and no mistakes were made. As shown in FIG. 9A, both training and validation learning curves are minimizing with time showing that the training dataset is learned. Further, FIG. 9B shows that a performance of the model. The performance of the model is measured based on precision, recall, F1 score, and support. The accuracy of model based on the obtained data set is 96%.

Embodiments may be implemented on any suitable computing device, such as the computer system shown in FIG. 10. FIG. 10 is a block diagram of a computer system (1000) used to provide computational functionalities associated with described algorithms, methods, functions, processes, flows, and procedures as described in the instant disclosure, according to an implementation. Additionally, the embodiments may be implemented as a standalone software or a plug-in using another software to operate. The illustrated computer (1000) is intended to encompass any computing device such as a high-performance computing (HPC) device, a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (1000) may include a computer that includes an input device, such as a keypad, keyboard, touch screen, or other device that can accept user information, and an output device that conveys information associated with the operation of the computer (1000), including digital data, visual, or audio information (or a combination of information), or a GUI.

The computer (1000) can serve in a role as a client, network component, a server, a database or other persistency, or any other component (or a combination of roles) of a computer system for performing the subject matter described in the instant disclosure. The illustrated computer (1000) is communicably coupled with a network (1010). In some implementations, one or more components of the computer (1000) may be configured to operate within environments, including cloud-computing-based, local, global, or other environment (or a combination of environments).

At a high level, the computer (1000) is an electronic computing device operable to receive, transmit, process, store, or manage data and information associated with the described subject matter. According to some implementations, the computer (1000) may also include or be communicably coupled with an application server, e-mail server, web server, caching server, streaming data server, business intelligence (BI) server, or other server (or a combination of servers).

The computer (1000) can receive requests over network (1010) from a client application (for example, executing on another computer (1000) and responding to the received requests by processing the said requests in an appropriate software application. In addition, requests may also be sent to the computer (1000) from internal users (for example, from a command console or by other appropriate access method), external or third-parties, other automated applications, as well as any other appropriate entities, individuals, systems, or computers.

Each of the components of the computer (1000) can communicate using a system bus (1070). In some implementations, any or all of the components of the computer (1000), both hardware or software (or a combination of hardware and software), may interface with each other or the interface (1020) (or a combination of both) over the system bus (1070) using an application programming interface (API) (1050) or a service layer (1060) (or a combination of the API (1050) and service layer (1060). The API (1050) may include specifications for routines, data structures, and object classes. The API (1050) may be either computer-language independent or dependent and refer to a complete interface, a single function, or even a set of APIs. The service layer (1060) provides software services to the computer (1000) or other components (whether or not illustrated) that are communicably coupled to the computer (1000). The functionality of the computer (1000) may be accessible for all service consumers using this service layer. Software services, such as those provided by the service layer (1060), provide reusable, defined business functionalities through a defined interface. For example, the interface may be software written in JAVA, C++, or other suitable language providing data in extensible markup language (XML) format or other suitable format. While illustrated as an integrated component of the computer (1000), alternative implementations may illustrate the API (1050) or the service layer (1060) as stand-alone components in relation to other components of the computer (1000) or other components (whether or not illustrated) that are communicably coupled to the computer (1000). Moreover, any or all parts of the API (1050) or the service layer (1060) may be implemented as child or sub-modules of another software module, enterprise application, or hardware module without departing from the scope of this disclosure.

The computer (1000) includes an interface (1020). Although illustrated as a single interface (1020) in FIG. 10, two or more interfaces (1020) may be used according to particular needs, desires, or particular implementations of the computer (1000). The interface (1020) is used by the computer (1000) for communicating with other systems in a distributed environment that are connected to the network (1010). Generally, the interface (1020 includes logic encoded in software or hardware (or a combination of software and hardware) and operable to communicate with the network (1010). More specifically, the interface (1020) may include software supporting one or more communication protocols associated with communications such that the network (1010) or interface's hardware is operable to communicate physical signals within and outside of the illustrated computer (1000).

The computer (1000) includes at least one computer processor (1030). Although illustrated as a single computer processor (1030) in FIG. 10, two or more processors may be used according to particular needs, desires, or particular implementations of the computer (1000). Generally, the computer processor (1030) executes instructions and manipulates data to perform the operations of the computer (1000) and any algorithms, methods, functions, processes, flows, and procedures as described in the instant disclosure.

The computer (1000) also includes a memory (1080) that holds data for the computer (1000) or other components (or a combination of both) that can be connected to the network (1010). For example, memory (1080) can be a database storing data consistent with this disclosure. Although illustrated as a single memory (1080) in FIG. 10, two or more memories may be used according to particular needs, desires, or particular implementations of the computer (1000) and the described functionality. While memory (1080) is illustrated as an integral component of the computer (1000), in alternative implementations, memory (1080) can be external to the computer (1000).

The application (1040) is an algorithmic software engine providing functionality according to particular needs, desires, or particular implementations of the computer (1000), particularly with respect to functionality described in this disclosure. For example, application (1040) can serve as one or more components, modules, applications, etc. Further, although illustrated as a single application (1040), the application (1040) may be implemented as multiple applications (1040) on the computer (1000). In addition, although illustrated as integral to the computer (1000), in alternative implementations, the application (1040) can be external to the computer (1000).

There may be any number of computers (1000) associated with, or external to, a computer system containing computer (1000), each computer (1000) communicating over network (1010). Further, the term "client," "user," and other appropriate terminology may be used interchangeably as appropriate without departing from the scope of this disclosure. Moreover, this disclosure contemplates that many users may use one computer (1000), or that one user may use multiple computers (1000).

In some embodiments, the computer (1000) is implemented as part of a cloud computing system. For example, a cloud computing system may include one or more remote servers along with various other cloud components, such as cloud storage units and edge servers. In particular, a cloud computing system may perform one or more computing operations without direct active management by a user device or local computer system. As such, a cloud computing system may have different functions distributed over multiple locations from a central server, which may be performed using one or more Internet connections. More specifically, cloud computing system may operate according to one or more service models, such as infrastructure as a service (IaaS), platform as a service (PaaS), software as a service (SaaS), mobile "backend" as a service (MBaaS), serverless computing, artificial intelligence (AI) as a service (AIaaS), and/or function as a service (FaaS).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed is:

1. A method for generating labeled benchmark dataset comprising:

obtaining, using a computer processor, a plurality of sources related to a thin section using web scraping;

extracting, using the computer processor, a plurality of images from the plurality of sources related to the thin section, the plurality of images including a plurality of thin section images and a plurality of non-thin section images;

training, using the computer processor, a convolutional neural network comprising convolutional, pooling, and fully connected layers trained using backpropagation to identify a plurality of thin section features;

determining, using the computer processor and based on the trained convolutional neural network, the plurality of thin section images from the plurality of extracted images;

generating, using the computer processor, a classification of the plurality of thin section images based on a given classification criteria;

training, using the computer processor, geological thin-section based machine learning models based on the generated classification of the plurality of thin section images, where the geological thin-section based machine learning models predict a plurality of reservoir properties including a change in fluid flow based on predicted porosity, permeability, and grain morphology;

generating, using the computer processor, a wellbore drilling plan based on the geological thin-section based machine learning models predicting the change in fluid flow, the wellbore drilling plan including at least a drilling trajectory, a casing point selection, and mud weight recommendations; and drilling, using a drilling system, a wellbore path based on the wellbore drilling plan that is generated based on the geological thin-section based machine learning models.

2. The method of claim 1, further comprising: determining, using the computer processor, data fields to be scraped, the data fields including images, image labels, texts, and links; and determining, using the computer processor, data structures to which scraped data fields are exported to, the data structures including PDF file, comma separated values, and database.

3. The method of claim 1, wherein the web scraping is configured to search websites and online literature libraries.

4. The method of claim 1, wherein the extracted images are filtered to remove images that do not satisfy a thin section specification, the thin section specification including an image resolution, an image format, a color accuracy, an image sharpness, an image focus, and a file size.

5. The method of claim 4, wherein the extracted images are filtered using a machine learning model, wherein the machine learning model is a convolutional neural network comprising an input layer, a plurality of hidden layers, and an output layer, and wherein the machine learning model includes a down sampling or up sampling layer.

6. The method of claim 1, wherein the classification criteria include texture, mineralogy, and fossils.

7. The method of claim 1, wherein the generated classification of the thin section image is saved as a property of the thin section image.

8. The method of claim 1, wherein duplicated thin section images are removed based hash function assigned to each thin section image.

9. A non-transitory computer readable medium storing instructions executable by a computer processor, the instructions comprising functionality for:

obtaining a plurality of sources related to a thin section using web scraping;

extracting a plurality of images from the plurality of sources related to the thin section, the plurality of images including a plurality of thin section images and a plurality of non-thin section images;

training a convolutional neural network comprising convolutional, pooling, and fully connected layers trained using backpropagation to identify a plurality of thin section features;

determining, based on the trained convolutional neural network, the plurality of thin section images from the plurality of extracted images;

generating a classification of the plurality of thin section images based on a given classification criteria;

training geological thin-section based machine learning models based on the generated classification of the plurality of thin section images, where the geological thin-section based machine learning models predict a plurality of reservoir properties including a change in fluid flow based on predicted porosity, permeability, and grain morphology; and generating a wellbore drilling plan based on the geological thin-section based machine learning models predicting the change in fluid flow, the wellbore drilling plan including at least a drilling trajectory, a casing point selection, and mud weight recommendations, wherein a wellbore path is drilled using a drilling system and based on the wellbore drilling plan that is generated based on the geological thin-section based machine learning models.

10. The non-transitory computer readable medium of claim 9, further comprising determining data fields to be scraped, the data fields including images, image labels, texts, and links, and determining data structures to which scraped data fields are exported to, the data structures including PDF file, comma separated values, and database.

11. The non-transitory computer readable medium of claim 9, wherein the web scraping is designed to search websites and online literature libraries.

12. The non-transitory computer readable medium of claim 9, wherein the extracted images are filtered to remove images that do not satisfy a thin section specification, the thin section specification including an image resolution, an image format, a color accuracy, an image sharpness, an image focus, and a file size.

13. The non-transitory computer readable medium of claim 12, wherein the extracted images are filtered using a machine learning model, wherein the machine learning model is a convolutional neural network comprising an input layer, a plurality of hidden layers, and an output layer, and wherein the machine learning model includes a down sampling or up sampling layer.

14. The non-transitory computer readable medium of claim 9, wherein the classification criteria include texture, mineralogy, and fossils.

15. A system comprising:

a labeled benchmark data set generation simulator comprising a computer processor, the labeled benchmark data set generation simulator comprising functionality for:

obtaining a plurality of sources related to a thin section using web scraping;

extracting a plurality of images from the plurality of sources related to the thin section, the plurality of images including a plurality of thin section images and a plurality of non-thin section images;

training a convolutional neural network comprising convolutional, pooling, and fully connected layers trained using backpropagation to identify a plurality of thin section features;

determining, based on the trained convolutional neural network, the plurality of thin section images from the plurality of extracted images;

generating a classification of the plurality of thin section images based on a given classification criteria;

training geological thin-section based machine learning models based on the generated classification of the plurality of thin section images, where the geological thin-section based machine learning models predict a plurality of reservoir properties including a change in fluid flow based on predicted porosity, permeability, and grain morphology; and generating a wellbore drilling plan based on the geological thin-section based machine learning models predicting the change in fluid flow, the wellbore drilling plan including at least a drilling trajectory, a casing point selection, and mud weight recommendations;

a drilling system, wherein the drilling system is configured to drill a wellbore path based on the wellbore drilling plan that is generated based on the geological thin-section based machine learning models.

16. The system of claim 15, further comprising determining data fields to be scraped, the data fields including images, image labels, texts, and links, and determining data structures to which scraped data fields are exported to, the data structures including PDF file, comma separated values, and database.

17. The system of claim 15, wherein the web scraping is designed to search websites and online literature libraries.

18. The system of claim 15, wherein the extracted images are filtered to remove images that do not satisfy a thin section specification, the thin section specification including an image resolution, an image format, a color accuracy, an image sharpness, an image focus, and a file size.

19. The system of claim 18, wherein the extracted images are filtered using a machine learning model, wherein the machine learning model is a convolutional neural network comprising an input layer, a plurality of hidden layers, and an output layer, and wherein the machine learning model includes a down sampling or up sampling layer.

20. The system of claim 15, wherein the classification criteria include texture, mineralogy, and fossils.

* * * * *